Figure 1:
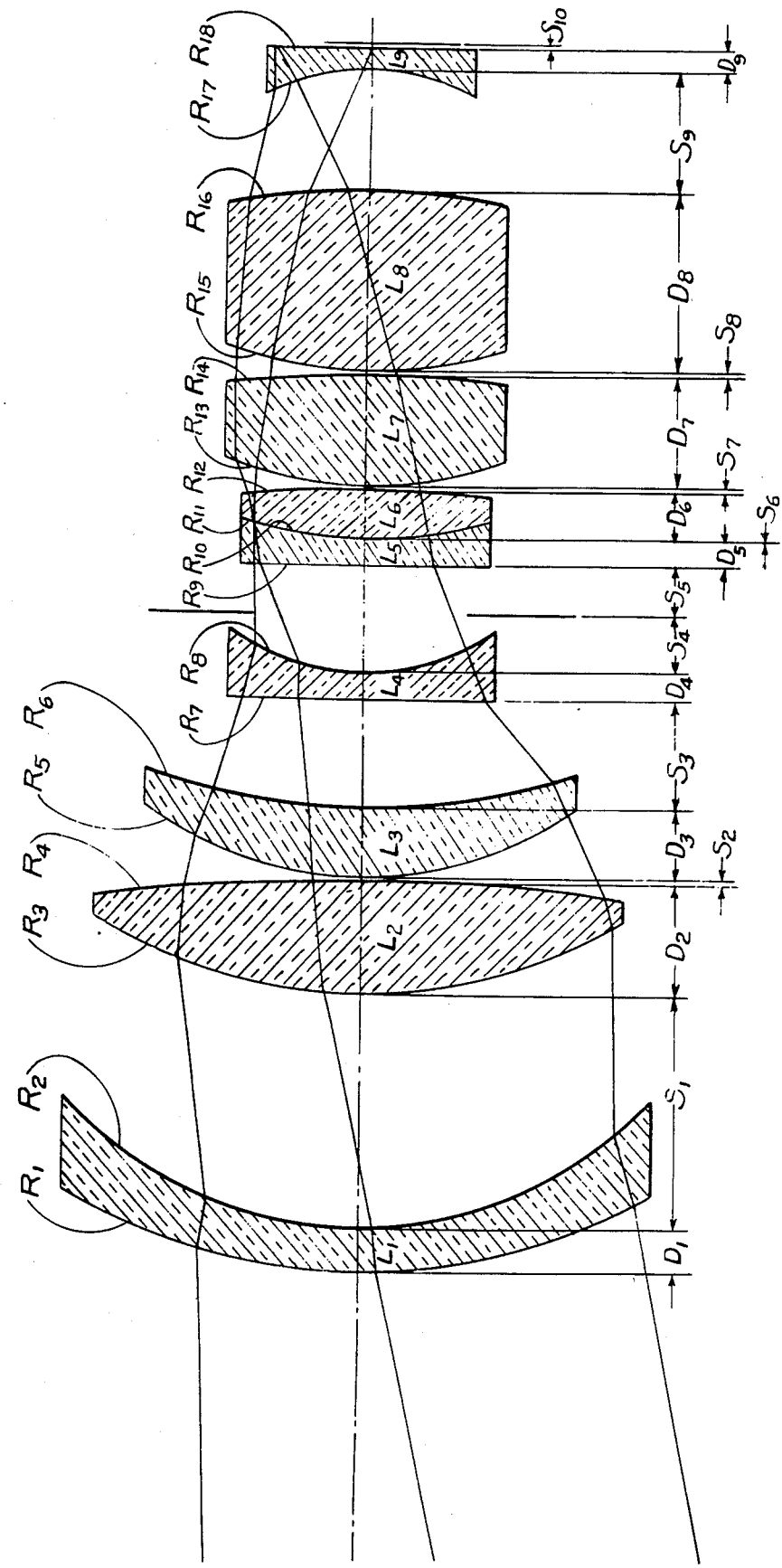

United States Patent
Fleischman

[11] 4,050,778
[45] Sept. 27, 1977

[54] ULTRA-VIOLET MICROGRAPHIC OBJECTIVE

[75] Inventor: Andor A. Fleischman, Northbrook, Ill.

[73] Assignee: Bell & Howell Company, Chicago, Ill.

[21] Appl. No.: 713,320

[22] Filed: Aug. 10, 1976

[51] Int. Cl.² ............................ G02B 13/14; G02B 9/64
[52] U.S. Cl. ..................................... 350/2; 350/214
[58] Field of Search ...................... 350/2, 214

[56] References Cited
PUBLICATIONS

Tibbetts et al., *IBM Technical Disclosure Bulletin*, vol. 14, No. 7, Dec. 1971, pp. 2026–2027.
Woeltche, *Applied Optics*, vol. 7, No. 2, Feb. 1968, pp. 343–351.

*Primary Examiner*—Ronald J. Stern
*Attorney, Agent, or Firm*—Roger M. Fitz-Gerald; John E. Peele, Jr.

[57] ABSTRACT

An economical optical system without elements of more exotic optical materials for imaging light rays from an ultra-violet or near ultra-violet light source of an optical instrument.

1 Claim, 9 Drawing Figures

F/1.29

F/1.85

12.58°

8.98°

ULTRA-VIOLET MICROGRAPHIC OBJECTIVE

This invention relates to an optical system for imaging light rays from a near ultra-violet light source, the system being designed with substantially conventional optical materials.

Optical systems have been designed for efficiently transmitting light rays in the near ultra-voilet portion of the visible light spectrum. However, most of these optical systems have required that one or more elements be of the more exotic optical materials, such as quartz, to obtain necessary optical correction for efficiently imaging light rays of that spectral portion. However, due to the fragile nature of quartz and other of the special optical materials, costs of manufacture of the elements using these materials is high. Further, assembly of these elements into an optical system requires extremely high care to maintain the degree of optical correction for which the objective is designed.

To provide an economically manufactured objective for transmitting efficiently the ultra-violet or near ultra-violet portion of the spectrum, an objective has been designed using more conventional optical glass materials. Since elements of these materials can be manufactured by known techniques, and only conventional handling and assembling care is required, a high grade objective of reduced cost is available. Particularly, the objective lens for an optical instrument, such as a microfilm imaging lens, is designed to have good contrast transmission capability as well as high line pair resolution. That is, the light rays of a preferred portion of the spectrum are imaged without degradation on an image plane with a high degree of clarity.

An object of the invention is to provide an economically manufacturable objective lens for transmitting light rays rich in the ultra-violet portion of the spectrum with a high degree of optical correction.

Other objects and advantages of the invention will become apparent from the detailed description which follows when taken in conjunction with the accompanying drawings in which:

FIG. 1 is a diagrammatic sectional view of a preferred optical system according to the present invention; and FIGS. 2a to 2h are graphical representations of the various aberrations of the lens system shown in FIG. 1 and having the design data given in Table 1.

Referring to the drawings, an optical system is shown for imaging light rays from an object which would be located to the left of FIG. 1. In this preferred embodiment, the objective lens is used for reducing graphic material from a sheet size to a micro-graphic size at an approximate ratio of 1 to 26. The objective lens, which has an effective focal length of 1.1751 inches (29.85mm) and a half angle of 12.15°, images the object to a 0.616 inches diagonal image format. The copier in which this embodiment of the objective lens is to be used is provided with a light source in which the output, in addition to visible light rays, is high in the ultra-violet portion of the spectrum. Specifically, the near ultra-violet portion of the spectrum of particular interest is centered about 6328 Angstroms wavelength. The material at the image plane on which the reduced copy is to be made generally referred to as film, may or may not be silver based material. Although the material is selected to be highly sensitive to ultra-violet radiation, visible radiation usually will image the object thereon as well. Hence, the objective lens must be efficient in both the visible and the near ultra-violet portions of the spectrum. Since the imaging material is relatively slow and only a portion of the output of the light is in the ultra-violet spectrum and therefore usable effectively for illuminating the object so that the image is recorded, the objective lens is designed with a high effective aperture. Specifically, in this preferred embodiment, the objective lens has an effective aperture of f/1.20.

The optical system of FIG. 1 includes a first element $L_1$, starting at the ray entrance side of the system and positioned nearest a not shown object. This meniscus element defines a first component of positive power. The light rays therefrom are transmitted to the unequal bi-convex lens $L_2$ and the meniscus element $L_3$, which define a second component. From this second component, the light rays are transmitted to a spaced negative element $L_4$ which defines a third component. These components receive the rays from the object and transmit the image of the object toward and through a stop, which is internal of the optical system. Elements $L_3$ and $L_4$ are paired so that the sum of their central thickness is within ±0.0015 inch, although the elements may otherwise be within the desired tolerance. The stop is arranged intermediate elements $L_4$ and a fourth component which is axially spaced from element $L_4$, and includes elements $L_5$ and $L_6$;

Elements $L_5$ and $L_6$ along with positive elements $L_7$ and $L_8$ form a highly corrected prime lens for transmitting the image toward the image plane. Plano concave element $L_9$ causes the final corrections of the transmitted light rays prior to imaging on the image recording material which is essentially in contact with a planar outer surface of the element.

The optical values of the optical system of FIG. 1 are as follows:

| Lens | Radii(in.) | | Thickness(in.) | spacing (in.) | $N_D$ | V |
|---|---|---|---|---|---|---|
| $L_1$ | $R_1 =$ | 1.7850 | $D_1 = .1400$ | | 1.691 | 54.7 |
| | $R_2 =$ | −1.1450 | | $S_1 = .6410$ | | |
| $L_2$ | $R_3 =$ | 1.4440 | $D_2 = .3200$ | | 1.691 | 54.7 |
| | $R_4 =$ | 7.2120 | | $S_2 = .0050$ | | |
| $L_3$ | $R_5 =$ | 1.0360 | $D_3 = .1970$ | | 1.691 | 54.7 |
| | $R_6 =$ | −1.9500 | | $S_3 = .2890$ | | |
| $L_4$ | $R_7 =$ | −30.0003 | $D_4 = .0700$ | | 1.689 | 31.2 |
| | $R_8 =$ | −.6300 | | $S_4 = .1760$ | | |
| | — STOP — | | | | | |
| | | | | $S_5 = .1380$ | | |
| $L_5$ | $R_9 =$ | 120.0480 | $D_5 = .0700$ | | 1.717 | 29.5 |
| | $R_{10} =$ | −1.1450 | | $S_6 = 0$ | | |
| $L_6$ | $R_{11} =$ | 1.1450 | $D_6 = .1400$ | | 1.734 | 51.7 |
| | $R_{12} =$ | 15.0900 | | $S_7 = .0050$ | | |
| $L_7$ | $R_{13} =$ | 1.1210 | $D_7 = .3150$ | | 1.691 | 54.7 |
| | $R_{14} =$ | 27.1732 | | $S_8 = .0050$ | | |
| $L_8$ | $R_{15} =$ | 1.2920 | $D_8 = .4990$ | | 1.691 | 54.7 |
| | $R_{16} =$ | 2.6603 | | $S_9 = .3240$ | | |
| $L_9$ | $R_{17} =$ | −0.6160 | $D_9 = .0550$ | $S_{10} = .0094$ (BFL to FILM PLANE) | 1.498 | 67.1 |
| | $R_{18} =$ | Inf. | | | | |

EFL = 1.1751 inches (29.85 mm)
Half Angle of Field = 12.15°

In the above table, the first column lists the lens elements ($L_1$ to $L_9$) numerically starting at the ray entrance side of the system. The second column lists the radii in inches for the respective surfaces ($R_1$ to $R_{18}$) of the elements. The third and fourth columns list the thickness of the respective elements and the axial spacings between the respective elements and the nominal image plane. The fifth and sixth columns respectively list the refractive index $N_D$ and the dispersion index V of the glass used for the elements. "EFL" is the effective focal length of the lens system. "Half Angle of Field" is one-half the angle between the continuation of the lens axis and a line from the nodal point of the lens to the most oblique point of the object field recorded on the image recording material.

Figure 2A:
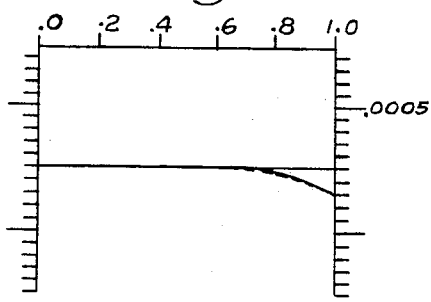
Figure 2B:
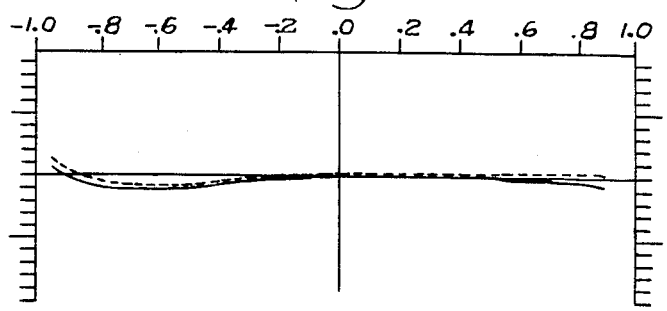
Figure 2C:
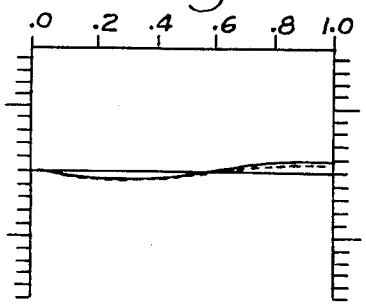
Figure 2D:
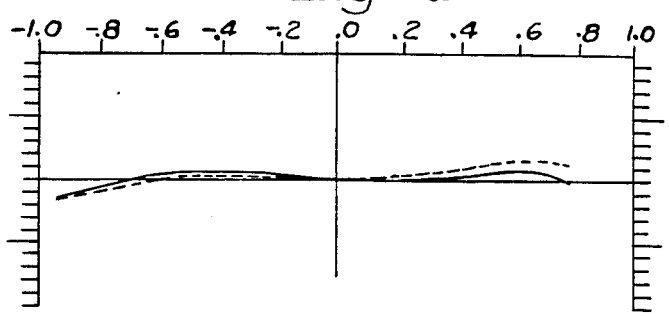
Figure 2E:
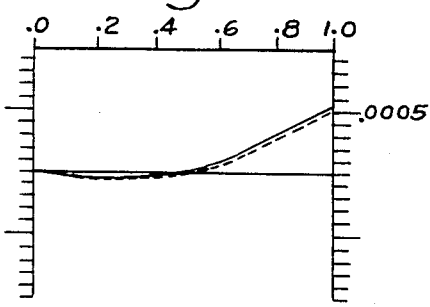
Figure 2F:
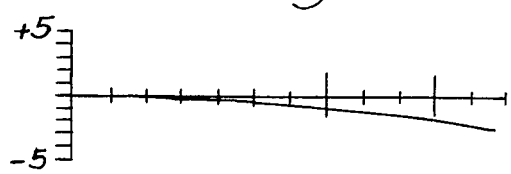
Figure 2G:
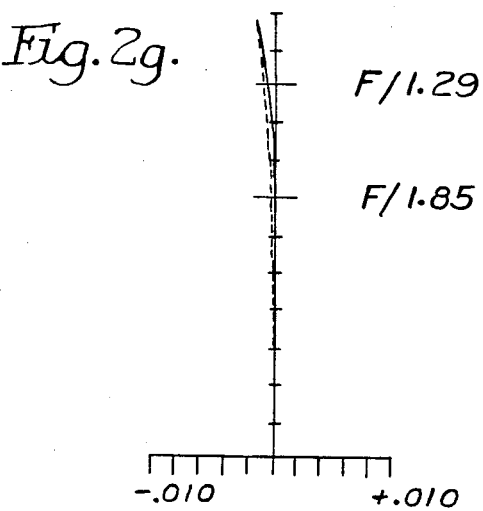
Figure 2H:
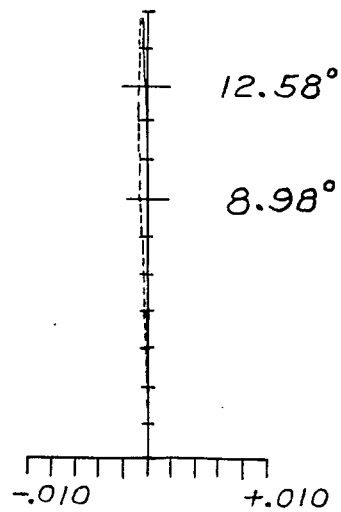

As seen in FIGS. 2a – 2h, which diagrammatically represent aberrations of the optical system, a high degree of correction is obtained for the ultra-violet and visible portions of the spectrum, while maintaining a relatively large effective aperture. FIG. 2a represents axial chromatic correction of the light rays on axis and lateral. FIG. 2b represents off axis aberrations of a ray passing from the zone of the film format and through the lens transversely and tangentially. FIG. 2c represents the aberrations of the rays passing from the corner of the film format through the lens tangentially and transversely. FIG. 2d represents the radial or longitudinal aberrations from the zone of the film format of rays entering the lens at 3 o'clock, while FIG. 2e represents similar aberrations from full field or corner rays. FIG. 2f represents distortion as a percentage of a "perfect" image. FIG. 2g represents the spherical aberrations by a full line and the offense-against-sine condition by the dotted line. FIG. 2h represents the curvature being shown in full line and sagittal curvature being shown in dashed line.

What is claimed is:

1. An economically manufacturable optical system of relatively large effective aperture for efficiently transmitting rays in the ultra-violet portion of the spectrum, the optical system having substantially the following specifications:

EFL = 1.1751 inches (29.85 mm)
Half Angle of Field = 12.15°

| Lens | Radii(in.) | | Thickness(in.) | spacing (in.) | $N_D$ | V |
|---|---|---|---|---|---|---|
| $L_1$ | $R_1 =$ | 1.7850 | $D_1 = .1400$ | | 1.691 | 54.7 |
| | $R_2 =$ | −1.1450 | | $S_1 = .6410$ | | |
| $L_2$ | $R_3 =$ | 1.4440 | $D_2 = .3200$ | | 1.691 | 54.7 |
| | $R_4 =$ | 7.2120 | | $S_2 = .0050$ | | |
| $L_3$ | $R_5 =$ | 1.0360 | $D_3 = .1970$ | | 1.691 | 54.7 |
| | $R_6 =$ | −1.9500 | | $S_3 = .2890$ | | |
| $L_4$ | $R_7 =$ | −30.0003 | $D_4 = .0700$ | | 1.689 | 31.2 |
| | $R_8 =$ | −.6300 | | $S_4 = .1760$ | | |
| | — STOP — | | | | | |
| | | | | $S_5 = .1380$ | | |
| $L_5$ | $R_9 =$ | 120.0480 | $D_5 = .0700$ | | 1.717 | 29.5 |
| | $R_{10} =$ | −1.1450 | | $S_6 = 0$ | | |
| $L_6$ | $R_{11} =$ | 1.1450 | $D_6 = .1400$ | | 1.734 | 51.7 |
| | $R_{12} =$ | 15.0900 | | $S_7 = .0050$ | | |
| $L_7$ | $R_{13} =$ | 1.1210 | $D_7 = .3150$ | | 1.691 | 54.7 |
| | $R_{14} =$ | 27.1732 | | $S_8 = .0050$ | | |
| $L_8$ | $R_{15} =$ | 1.2920 | $D_8 = .4990$ | | 1.691 | 54.7 |
| | $R_{16} =$ | 2.6603 | | $S_9 = .3240$ | | |
| $L_9$ | $R_{17} =$ | −0.6160 | $D_9 = .0550$ | $S_{10} = .0094$ (BFL to FILM PLANE) | 1.498 | 67.1 |
| | $R_{18} =$ | Inf. | | | | | wherein the first column lists the lens elements numerically starting at the ray entrance side of the system; the second column lists the respective base radii $R_1$ to $R_{18}$; the third column lists the thicknesses of the respective elements; the fourth column lists the axial spacings $S_1$ to $S_{10}$ between respective elements; and the fourth and fifth columns list respectively the refractive index and the dispersive index of the optical material.

* * * * *